United States Patent
Yang et al.

(10) Patent No.: US 9,620,938 B2
(45) Date of Patent: Apr. 11, 2017

(54) SWITCHBOARD APPLIED WITH BUSHING-TYPE CURRENT TRANSFORMER

(71) Applicant: LSIS CO., LTD., Anyang-si, Gyeonggi-do (KR)

(72) Inventors: Seung Pil Yang, Cheongju-si (KR); Kil Young Ahn, Daejeon (KR); Dae Soo Han, Cheongju-si (KR); Seung Hwan Mun, Cheongju-si (KR); Jong Doo Kim, Cheongju-si (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 14/743,906

(22) Filed: Jun. 18, 2015

(65) Prior Publication Data

US 2016/0164268 A1    Jun. 9, 2016

(30) Foreign Application Priority Data

Dec. 3, 2014    (KR) .................... 10-2014-0172444

(51) Int. Cl.
*H02B 11/26* (2006.01)
*H02B 1/30* (2006.01)
(Continued)

(52) U.S. Cl.
CPC .............. *H02B 11/26* (2013.01); *H02B 1/30* (2013.01); *H02B 11/04* (2013.01); *H02B 11/12* (2013.01)

(58) Field of Classification Search
CPC ......... H02B 11/26; H02B 11/04; H02B 11/12; H02B 1/03; H02B 1/20; H02B 1/24; H02B 1/30

(Continued)

(56) References Cited

U.S. PATENT DOCUMENTS 3,461,348 A * 8/1969 Eichelberger .......... H02B 11/26
                                                361/606
3,793,562 A * 2/1974 Cleaveland .......... H02B 11/167
                                                174/152 R (Continued)

FOREIGN PATENT DOCUMENTS

CN          2686171          3/2005
CN          2686171 Y    *   3/2005

(Continued)

OTHER PUBLICATIONS

European Patent Office Application Serial No. 15172736.9, Search Report dated Apr. 8, 2016, 7 pages.

(Continued)

*Primary Examiner* — Zachary M Pape
(74) *Attorney, Agent, or Firm* — Lee, Hong, Degerman, Kang & Waimey PC

(57) ABSTRACT

A switchboard applied with a bushing-type current transformer includes a terminal bushing inserted from a front direction, a switchboard terminal coupled to the terminal bushing, a metering current transformer bushing inserted from a front direction and inserted into the terminal bushing while wrapping the switchboard terminal, and a metering current transformer disposed outside the metering current transformer bushing and assembled or disassembled at a front surface through a circuit breaker chamber. Thus, the switchboard applied with a bushing-type current transformer has an advantage of having a high degree of internal space utilization or capable of being made to be compact.

19 Claims, 21 Drawing Sheets

(51) Int. Cl.
*H02B 11/12* (2006.01)
*H02B 11/04* (2006.01)

(58) Field of Classification Search
USPC .................................................. 361/600–626
See application file for complete search history.

(56) References Cited

U.S. PATENT DOCUMENTS

| | | | | |
|---|---|---|---|---|
| 4,118,755 | A * | 10/1978 | Davies | H02B 1/56 |
| | | | | 174/16.1 |
| 5,295,041 | A * | 3/1994 | Metivier | H02B 1/21 |
| | | | | 312/257.1 |
| 6,489,782 | B1 | 12/2002 | Baier et al. | |
| 2011/0299228 | A1 | 12/2011 | Milovac et al. | |
| 2014/0185193 | A1 * | 7/2014 | Smith | H05K 5/0217 |
| | | | | 361/620 |
| 2015/0244156 | A1 * | 8/2015 | Kutalek | H02B 11/04 |
| | | | | 361/611 |
| 2015/0372468 | A1 * | 12/2015 | Motley | H01F 38/20 |
| | | | | 336/105 |
| 2016/0197459 | A1 * | 7/2016 | Motta | H02B 1/26 |
| | | | | 361/611 |
| 2016/0217898 | A1 * | 7/2016 | Kozuru | H01F 27/04 |

FOREIGN PATENT DOCUMENTS

| | | | | | |
|---|---|---|---|---|---|
| GB | 2252682 | A | * | 8/1992 | ........... H01B 17/301 |
| JP | 09231843 | A | * | 9/1997 | |
| JP | 11-26246 | | | 1/1999 | |
| JP | 2001-103619 | | | 4/2014 | |
| KR | 20-0279711 | | | 6/2002 | |

OTHER PUBLICATIONS

Korean Intellectual Property Office Application Serial No. 10-2014-0172444, Office Action dated Jan. 29, 2016, 4 pages.

* cited by examiner

Prior Art

SWITCHBOARD APPLIED WITH BUSHING-TYPE CURRENT TRANSFORMER

CROSS-REFERENCE TO RELATED APPLICATIONS

Pursuant to 35 U.S.C. §119(a), this application claims the benefit of earlier filing date and right of priority to Korean Patent Application No. 10-2014-0172444, filed on Dec. 3, 2014, the contents of which are all hereby incorporated by reference herein in its entirety.

BACKGROUND

The present disclosure relates to a switchboard and, more specifically, to a switchboard to which a bushing-type current transformer having a metering current transformer and a metering current transformer bushing is applied.

Generally, a switchboard is a device used in monitoring, controlling, and protecting an electric power system, several electric devices such as a circuit breaker and a current transformer are accommodated in the switchboard to operate or control a power plant and a substation and to operate a motor.

From among the electric devices accommodated in the switchboard, maintenance is able to be performed on those mounted on the front surface portion thereof from a direction of the front surface thereof, but maintenance is difficult to be performed on those mounted on a rear surface portion thereof unless a maintenance space having a particular or larger portion is ensured between the rear surface portion of the switchboard and a rear surface wall or a worker enters the switchboard through the front surface portion thereof.

FIG. 1 is a view illustrating a structure of compartments of a switchboard according to related arts when a circuit breaker is located at a test position, FIG. 2 is a view illustrating a structure of compartments of a switchboard according to related arts when a circuit breaker is located at an operation position, and FIG. 3 is a perspective view illustrating the inside of a circuit breaker chamber and the inside of a voltage transformer chamber of a switchboard according to related arts.

A switchboard applies a voltage and electric current while accommodating several sorts of devices therein and detects abnormality when a fault voltage or current occurs thereby blocking a circuit breaker or providing information to other control devices.

A plurality of compartments are provided in a switchboard so that spaces for accommodating the devices may be defined for each use, and each of the compartments should have shielding and insulating functions that are prescribed under laws and regulations.

The compartments of a switchboard may include a circuit breaker chamber 1 for accommodating a circuit breaker 6, a cable chamber 2 into which a input/output bus or a cable is introduced, a bus bar chamber 3 through which a bus bar passes, a voltage transformer chamber 4 for accommodating a metering voltage transformer, and a low voltage device chamber 5 for accommodating a low voltage device.

Here, each of the compartments, frames, and electric devices or internal components in the compartments are generally coupled to each other through a coupling technique using bolts.

Electric devices accommodated in a switchboard include a circuit breaker 6, a metering voltage transformer 7, a metering current transformer 8, a bus bar chamber bus bar 9, a cable chamber bus bar 10, a metering voltage transformer bus bar 11, a switchboard terminal 12 that is coupled to a bus bar and may be connected to the circuit breaker, a circuit breaker tulip-type terminal 13, and a input/output handle 14 transferring a circuit breaker body.

In the switchboard, as illustrated in FIG. 1, when the circuit breaker 6 is accommodated at a test position in the circuit breaker chamber 1, an electric current is not applied between a power supply and a load. On the other hand, in the switchboard, as illustrated in FIG. 2, when the circuit breaker 6 is located at an operation position, an electric current and voltage may be applied between a power supply and a load, and thus an electric current may be connected or disconnected by the circuit breaker.

The circuit breaker 6 is moved to a test position or an operation position by a input/output handle 14.

When the metering voltage transformer 7 is accommodated in the testing position, a voltage is not detected, as illustrated in FIG. 1. When located at the operation position, the metering voltage transformer 7 may detect a voltage by contacting a switchboard terminal 15 coupled to the metering voltage transformer bus bar 11, as illustrated in FIG. 2.

A method of moving the metering voltage transformer 7 to the test position or operation position may be the same as the method of moving the circuit breaker.

Referring to FIG. 3, side surface frames 16 are symmetrically disposed at both sides of the circuit breaker chamber 1 and voltage transformer chamber 4. A top plate rear surface 17, a top plate front surface 18, a middle base 19, and a bottom plate 20 are coupled to the side surface frames 16 from top to bottom. At a side of a rear surface, an upper rear plate 21, a middle rear plate 22, and a lower rear plate 23 are coupled to pillar frames 24 disposed at left and right sides. A circuit breaker chamber bushing terminal 26 and a voltage transformer chamber bushing terminal 27 are coupled to each of the rear plates 21, 22, and 23 and the pillar frames 24, and a circuit breaker chamber shutter 28 and a voltage transformer chamber shutter 29 are fixed to the pillar frames 24 in front of each of the bushing terminals. These shutters 28 and 29 are opened by a unit connected thereto when the circuit breaker 6 and metering voltage transformer 7 move to the operation position.

One or more front doors 28a, 28b, and 28c may be disposed at the switchboard. The front doors 28a, 28b, and 28c may include a low voltage device chamber door 28a, a circuit breaker chamber door 28b, and a voltage transformer chamber door 28c. A hinge shaft is disposed at one side of each of the front doors 28a, 28b, and 28c, and a handle and a locking unit are disposed at the other side thereof, so that the doors may be opened and closed. The front doors 28a, 28b, and 28c are usually provided so as to manage devices that require much maintenance or front-side maintenance, such as a circuit breaker, a voltage transformer, and a low voltage device that need to be input and output.

Rear doors 29a and 29b are mounted on the rear surface of the switchboard, and usually provided so as to enable to perform maintenance on the metering current transformer and the like that are difficult to be disposed in the front surface portion thereof. Here, a space needed for maintenance should be ensured to open the rear doors 29a and 29b.

For example, a device attached to the cable chamber 2 or bus bar chamber 3 is shaped such that maintenance may be performed only through the rear surface thereof, and therefore a work space for maintenance should be ensured at the rear surface of the switchboard.

That is, in a switchboard installation space, a front side pathway for the maintenance of a device disposed at a front surface portion with respect to the switchboard and a rear side work space for the maintenance of a device disposed at a rear surface portion should be respectively ensured.

However, a switchboard according to related arts may require a large installation space to ensure both a front side pathway and a rear side work space, and the installation thereof may be difficult when a space for installing a switchboard is limited.

SUMMARY

Embodiments provide a switchboard having a high degree of internal space utilization or capable of being made to be compact.

Embodiments also provide a switchboard by which a part of components disposed in the switchboard easily enters and exits.

Embodiments also provide a switchboard by which the insulating function of components disposed in the switchboard is improved.

In one embodiment, a switchboard applied with a bushing-type current transformer includes: a terminal bushing inserted from a front direction; a switchboard terminal coupled to the terminal bushing; a metering current transformer bushing inserted from a front direction, and inserted into the terminal bushing while wrapping the switchboard terminal; and a metering current transformer disposed outside the metering current transformer bushing and assembled or disassembled at a front surface through a circuit breaker chamber.

A terminal bushing mounter at which the terminal bushing may be installed may be provided inside at least one of a bus bar chamber and a cable chamber.

A current transformer mounter at which the metering current transformer may be installed may be provided on a rear plate of the circuit breaker chamber.

The metering current transformer bushing may include: a head portion; a protrusion portion protruding from the head portion and provided in a flange shape; and a body portion extending from the protrusion portion.

Wrinkles may be formed on the outer circumferential surface of at least one of the head portion and body portion.

The switchboard may further include a stress control sealed member disposed at the body portion.

A section in which the stress control sealed member is installed may be longer than a section in which the metering current transformer is installed.

An inner supporting portion supporting an end of the switchboard terminal may be provided in the body portion.

The switchboard terminal may be spaced without contacting the metering current transformer bushing excluding the inner supporting portion.

A ring conductor portion may be disposed at a front surface portion of the body portion.

An earthing member may be coupled to the ring conductor portion, and the earthing member may contact the switchboard terminal. The earthing member may be made of a leaf spring.

A semi-conductive layer may be disposed on the outer circumferential surface of the body portion.

The semi-conductive layer may be connected to a frame of the switchboard.

A base plate forming a lower portion of the circuit breaker chamber may be made of a module that may be separated from the switchboard.

The switchboard may further include a voltage transformer body input into or output from a voltage transformer chamber and a voltage transformer bus bar installed in a bus bar chamber or a cable chamber, wherein a voltage transformer terminal of the voltage transformer body may be directly connected to the voltage transformer bus bar through a contacting technique.

A voltage transformer cradle may be provided at the voltage transformer chamber, a voltage transformer cradle bushing may be disposed at the voltage transformer cradle, and the voltage transformer bus bar may be input into a rear portion of the voltage transformer cradle bushing. When the voltage transformer body is input to an operation position, the voltage terminal may be directly connected to the voltage transformer bus bar by being input into a front portion of the voltage transformer cradle bushing while not contacting the voltage transformer cradle bushing.

In another embodiment, a switchboard applied with a bushing-type current transformer includes: a casing having a front opening portion and a circuit breaker chamber including a circuit breaker disposed therein; a terminal bushing mounter disposed in the casing; a terminal bushing inserted into the terminal bushing mounter from a front portion of the terminal bushing mounter; a switchboard terminal coupled to the terminal bushing; a metering current transformer bushing inserted into a circuit breaker chamber rear plate forming the circuit breaker chamber, wrapping the switchboard terminal, and having a part inserted into the terminal bushing; a current transformer mounter disposed at the circuit breaker chamber rear plate; and a metering current transformer inserted into the current transformer mounter in a front portion of the current transformer mounter and assembled or disassembled by passing through the circuit breaker chamber.

The switchboard applied with a bushing-type current transformer may further include: a stress control sealed member disposed in the metering current transformer bushing; a ring conductor portion disposed at the metering current transformer bushing to be connected to the stress control sealed member; an earthing member coupled to the ring conductor portion and contacting the switchboard terminal to form an earth circuit; and a semi-conductive layer disposed at the outer surface of the metering current transformer bushing and earth-connected.

A base plate forming a lower portion of the circuit breaker chamber may be made of a module capable of being separated from the switchboard.

The casing may be partitioned into: a voltage transformer chamber having a voltage transformer disposed therein; a bus bar chamber through which a bus bar passes; and a cable chamber which a input/output bus or a cable enters. The switchboard applied with a bushing-type current transformer may further include: a voltage transformer body input into or output from the voltage transformer chamber; and a voltage transformer bus bar disposed in at least one of the bus bar chamber and cable chamber. A voltage transformer terminal of the voltage transformer body may be directly connected to the voltage transformer bus bar through a contacting technique.

A voltage transformer cradle may be provided at the voltage transformer chamber, a voltage transformer cradle bushing may be disposed at the voltage transformer cradle, and the voltage transformer bus bar may be input into a rear portion of the voltage transformer cradle bushing. When the voltage transformer body is input to an operation position, the voltage terminal may be directly connected to the voltage transformer bus bar by being input into a front portion of the voltage transformer cradle bushing while not contacting the voltage transformer cradle bushing.

The switchboard applied with a bushing-type current transformer according to an embodiment has an advantage of easily attaching and detaching a metering current transformer because the metering current transformer may be backwardly mounted or forwardly removed.

Moreover, a separate work space for attaching and detaching the metering current transformer needs not to be provided in an internal rear space of the internal space of the switchboard, so that the switch may have a higher degree of internal space utilization or may be made to be compact.

In addition, the metering current transformer has an advantage of being easily attached and detached even when a space between the rear surface of the switchboard and a structure disposed in a rear of the switchboard is narrow.

Furthermore, the stress control sealed member is disposed in the metering current transformer bushing, and the semiconductive layer is provided outside the metering current transformer bushing, so that a dielectric breakdown phenomenon may be minimized.

Still more, the base plate of the circuit breaker chamber is made of the module capable of being separated and removed, and the circuit breaker chamber and voltage transformer chamber may be connected when the base plate of the circuit breaker chamber is removed, so that maintenance may be easily performed on the switchboard.

Even more, the voltage transformer terminal is directly connected to the voltage transformer bus bar through a contacting technique, so that the voltage transformer cradle may be easily separated.

Much more, the voltage transformer terminal is not in contact with the voltage transformer cradle bushing, so that an insulating function is improved.

DETAILED DESCRIPTION OF THE EMBODIMENTS

Figure 1:
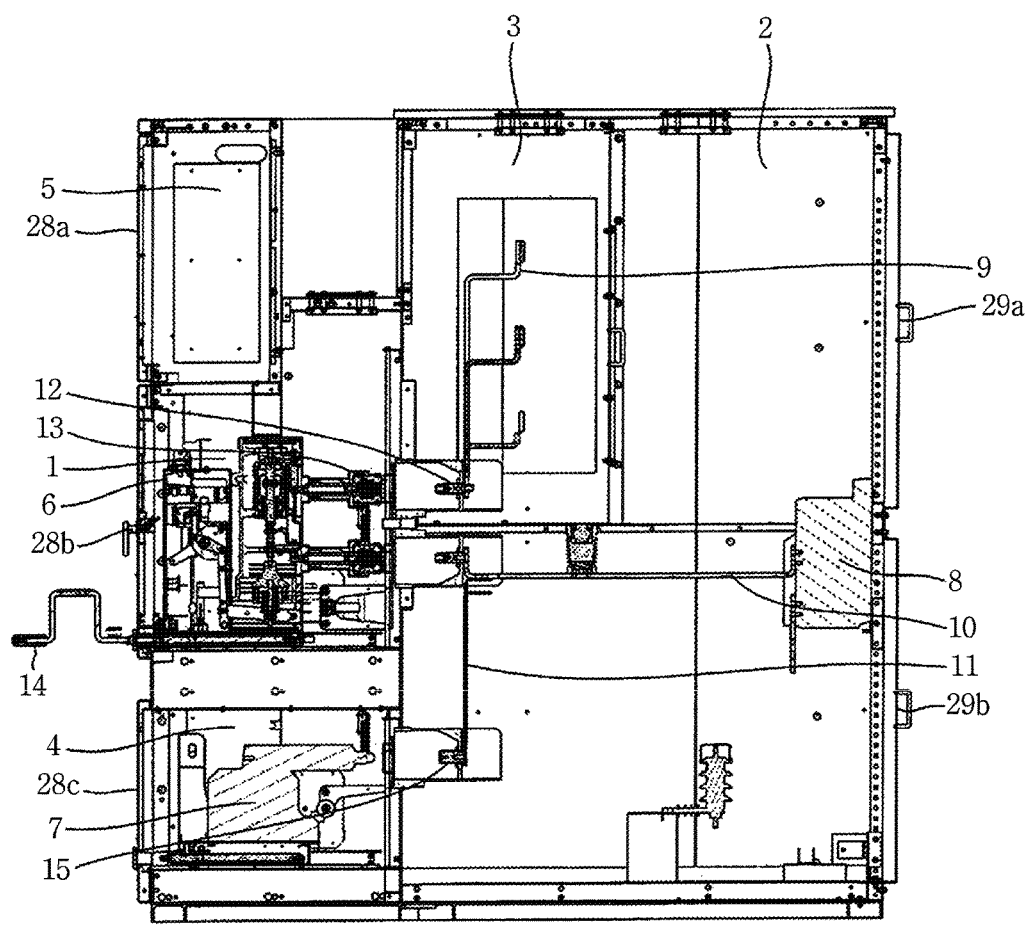
FIG. 1 is a view illustrating a structure of compartments of a switchboard according to related arts when a circuit breaker is located at a test position.
Figure 2:
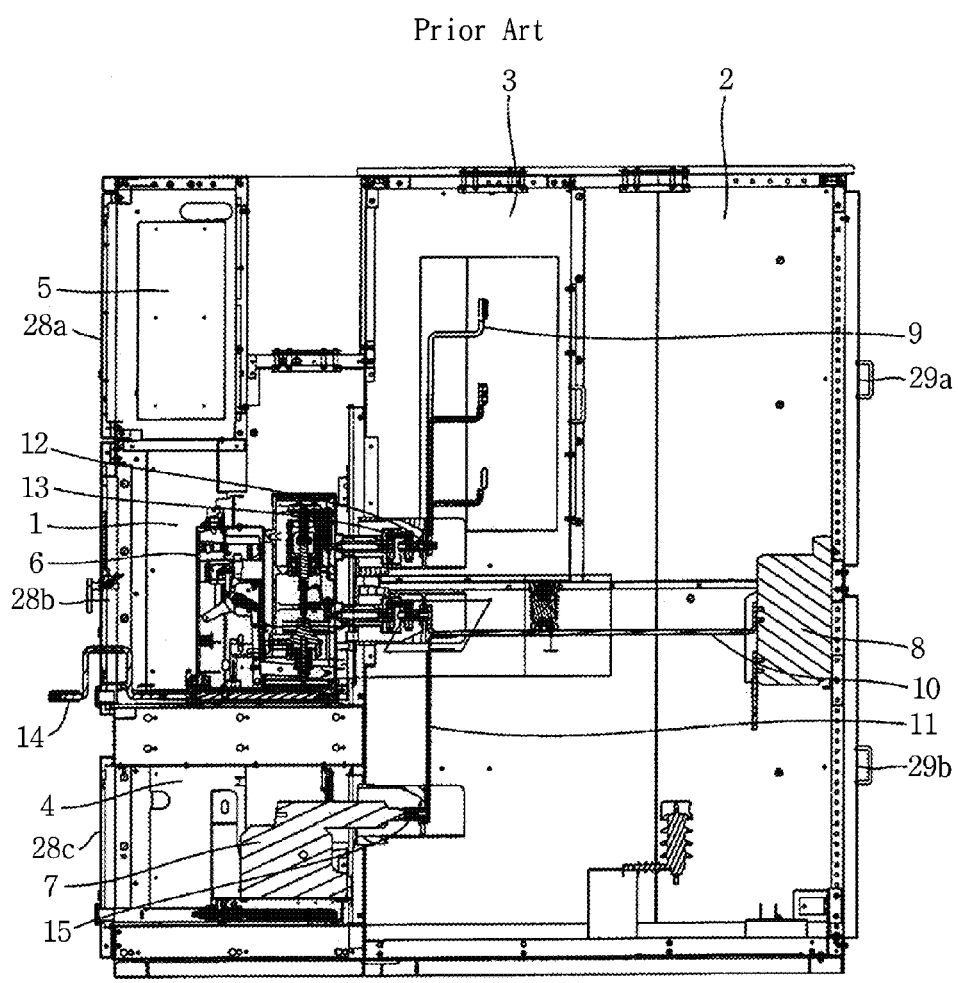
FIG. 2 is a view illustrating a structure of compartments of a switchboard according to related arts when a circuit breaker is located at an operation position.
Figure 3:
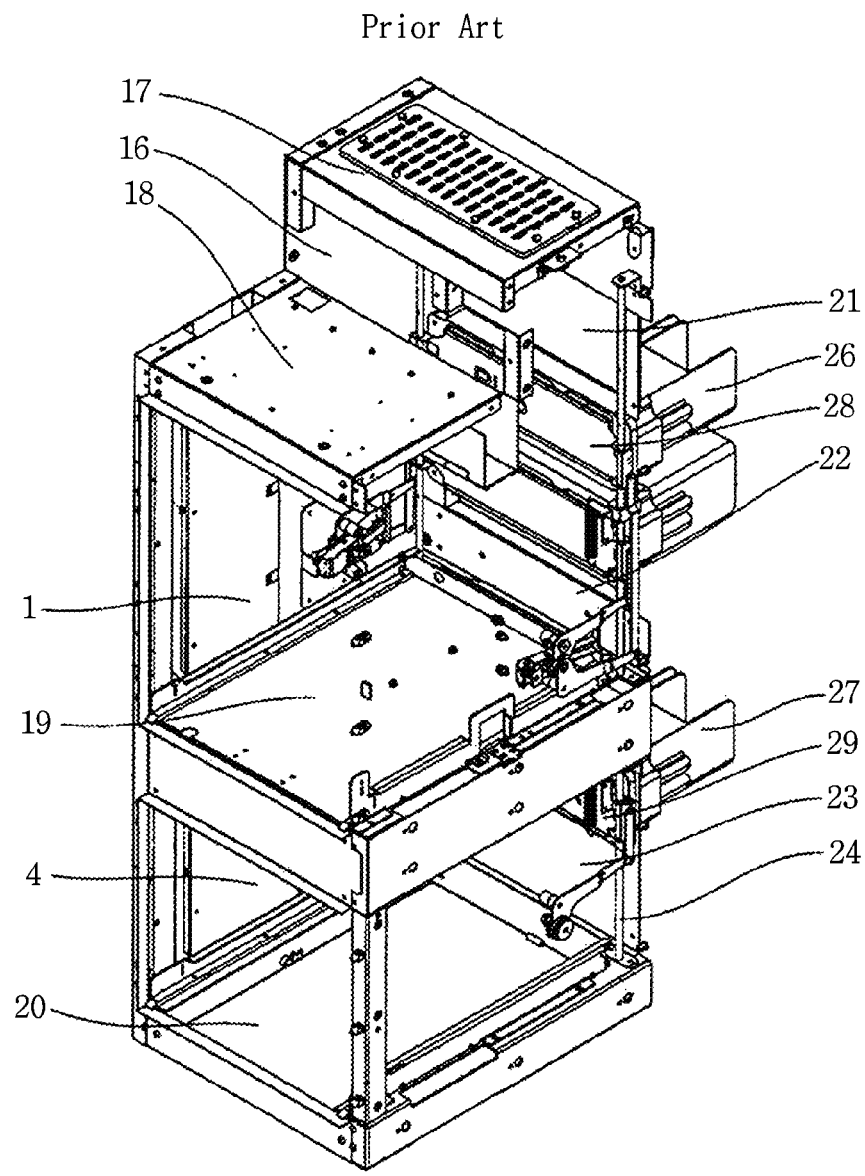
FIG. 3 is a perspective view illustrating the inside of a circuit breaker chamber and the inside of a voltage transformer chamber of a switchboard according to related arts.
Figure 4:
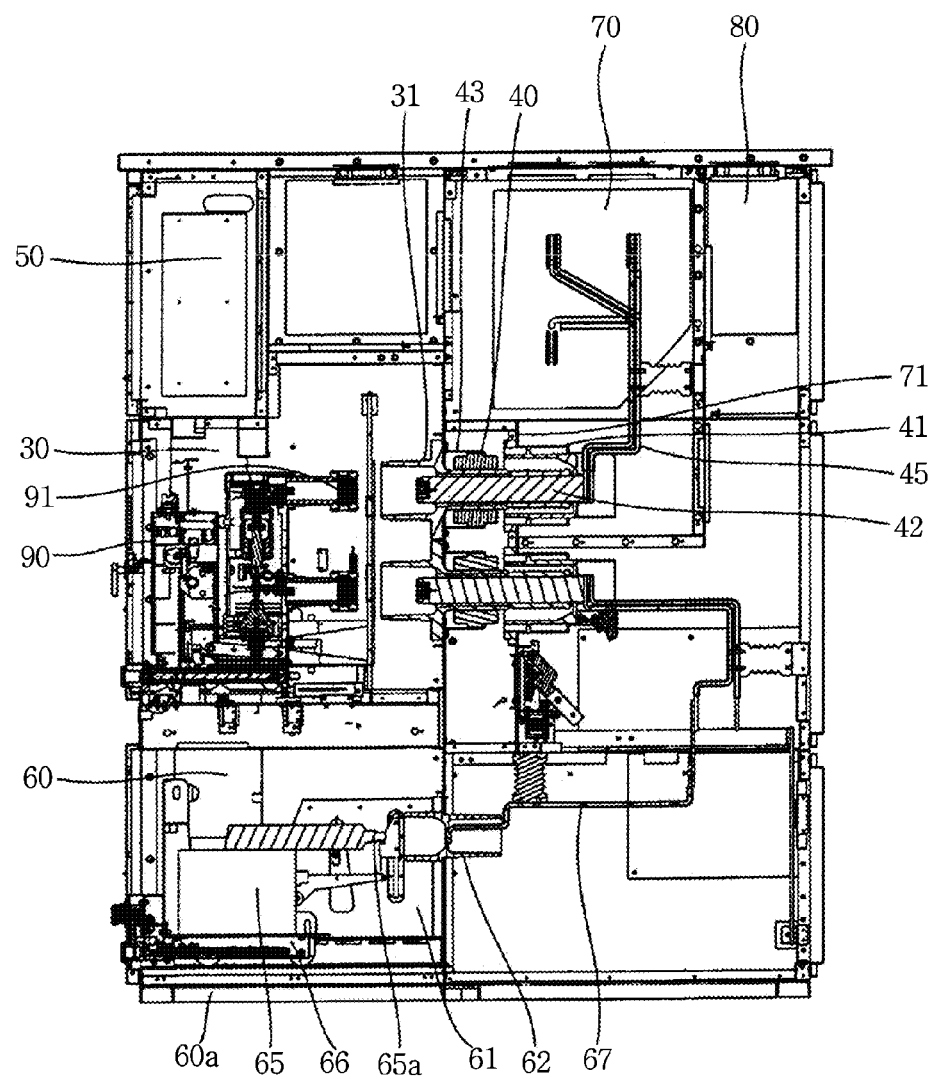
FIG. 4 is a cross-sectional view of a switchboard according to an embodiment when a circuit breaker and a voltage transformer of the switchboard are located at a test position.
Figure 5:
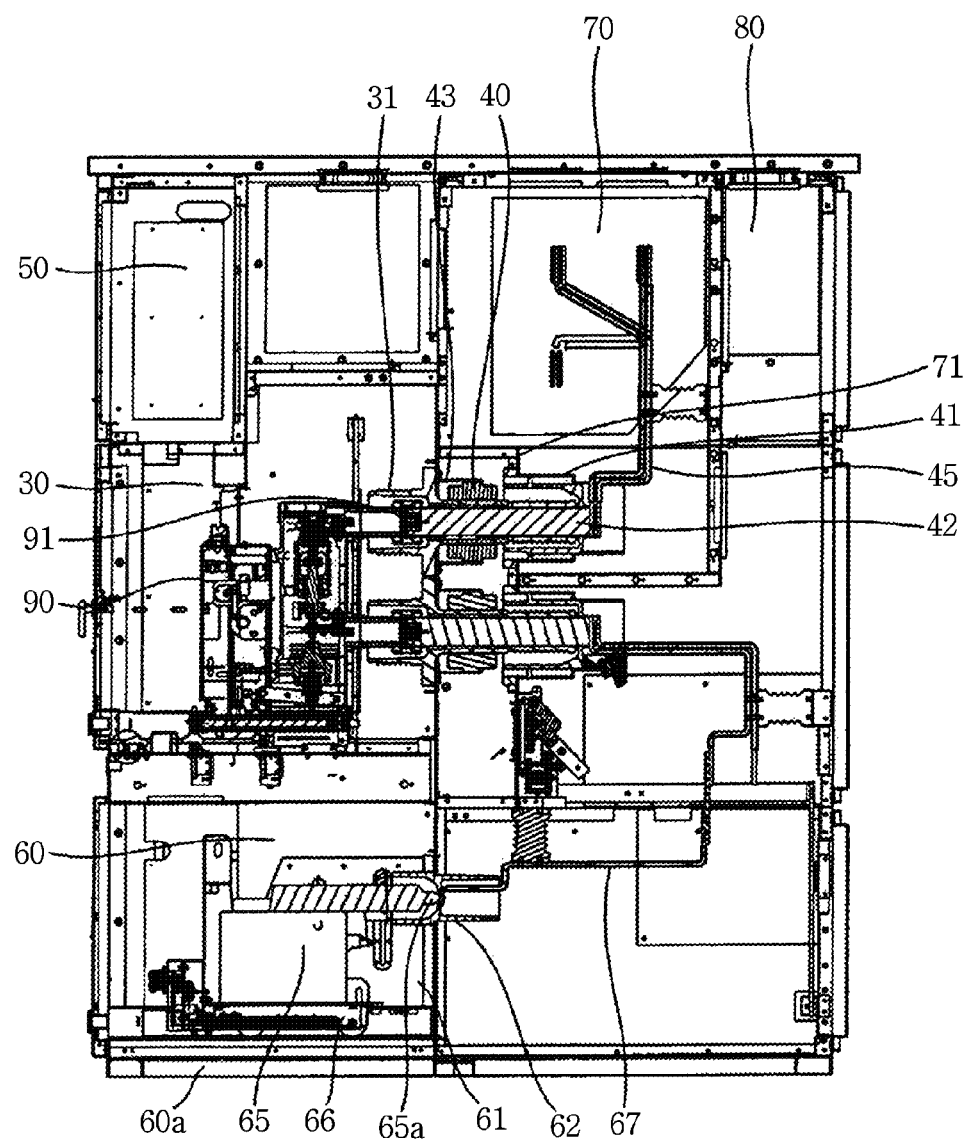
FIG. 5 is a cross-sectional view of a switchboard according to an embodiment when a circuit breaker and a voltage transformer of the switchboard are located at an operation position.
Figure 6:
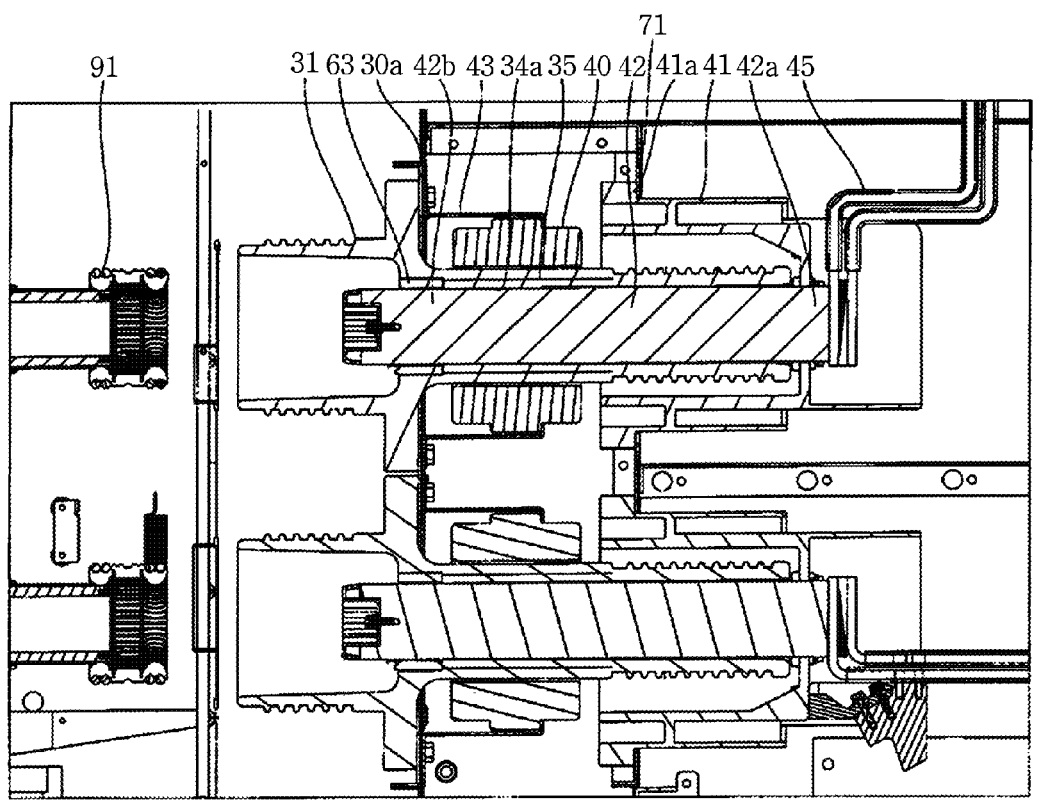
FIG. 6 is an enlarged cross-sectional view illustrating a terminal bushing, a switchboard terminal, a metering current transformer bushing, and a metering current transformer.
Figure 7:
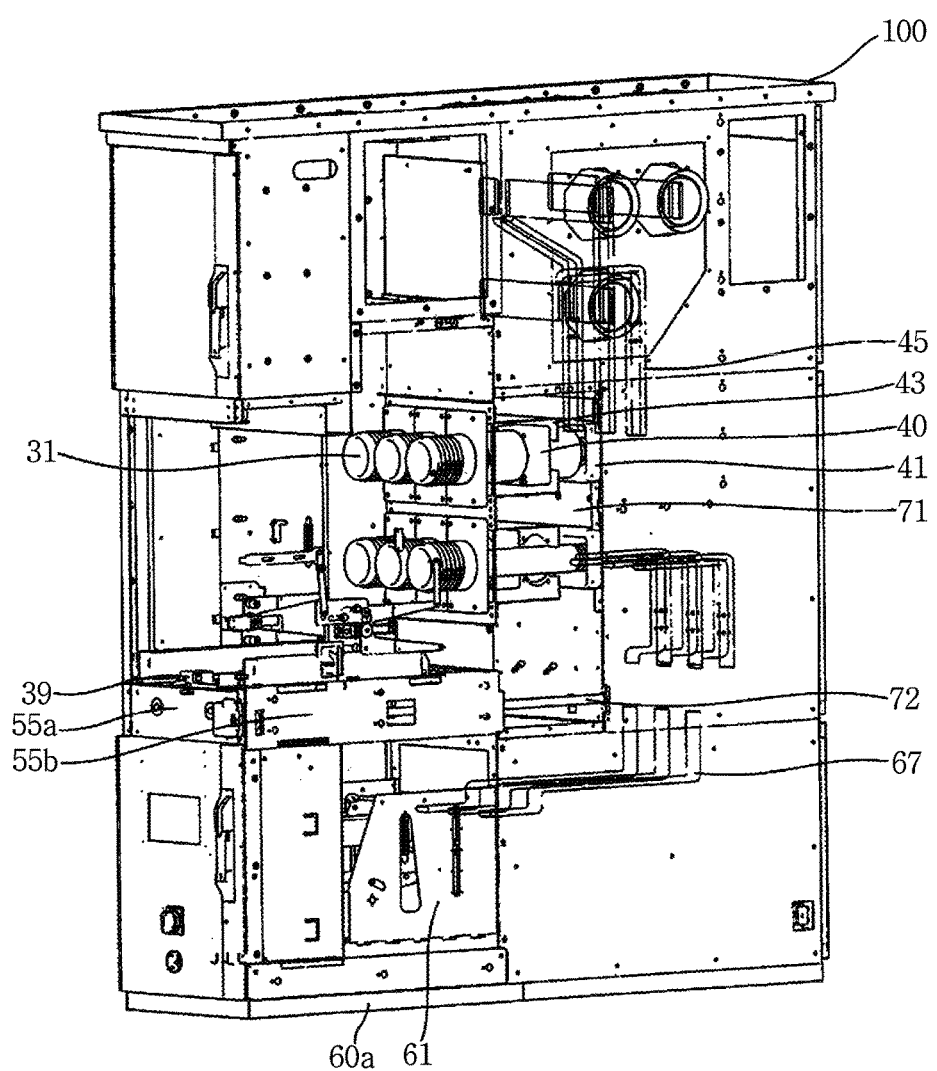
FIG. 7 is a perspective view illustrating the inside of a switchboard according to an embodiment.
Figure 8:
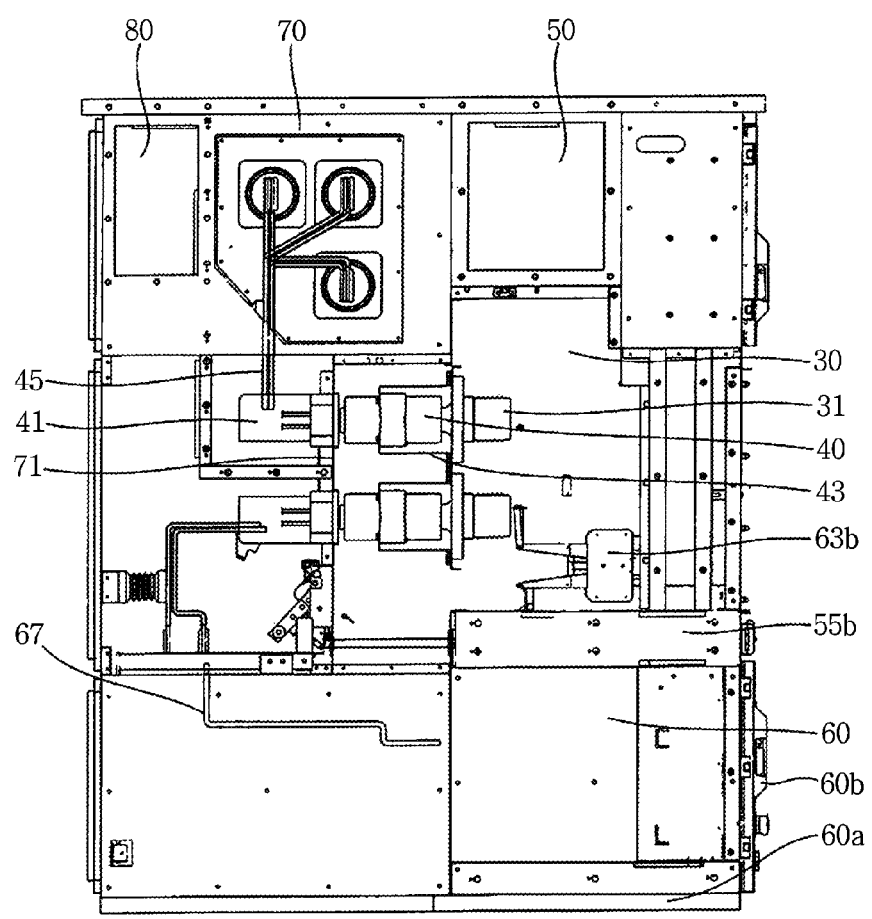
FIG. 8 is a side view illustrating the inside of a switchboard according to an embodiment.

Hereinafter, reference will be made to the embodiments of the present disclosure with reference to accompanying drawings, the reference as a detailed description enabling the disclosure to be easily worked by a person of ordinary skill in the art to which the present disclosure pertains but not meaning that technical ideas and categories of the present disclosure are restricted thereby.

A switchboard applied with a bushing-type current transformer according to an embodiment will be described below with reference to the drawings.

A switchboard applied with a bushing-type current transformer may include: a terminal bushing 41 inserted from a front direction; a switchboard terminal 42 coupled to the terminal bushing 41; a metering current transformer bushing 31 inserted from a front direction and inserted into the terminal bushing 41 while wrapping the switchboard terminal 42; and a metering current transformer 40 disposed outside the metering current transformer bushing 31. The metering current transformer bushing 31 may be assembled or disassembled at a front surface through a circuit breaker chamber 30.

Hereinafter, the switchboard applied with a bushing-type current transformer will be simply referred to as a switchboard, for convenience.

The switchboard may be partitioned into a plurality of compartments. The plurality of compartments may include a circuit breaker chamber 30 capable of accommodating a circuit breaker 90, a low voltage device chamber 50 for accommodating a low voltage device, a voltage transformer chamber 60 for accommodating a metering voltage transformer, a bus bar chamber 70 through which a bus bar passes, and a cable chamber 80 which a input/output bus or a cable enters. The switchboard may be partitioned into the circuit breaker chamber 30, a low voltage a device chamber 50, a voltage transformer chamber 60, a bus bar chamber 70, and a cable chamber 80.

Figure 16:
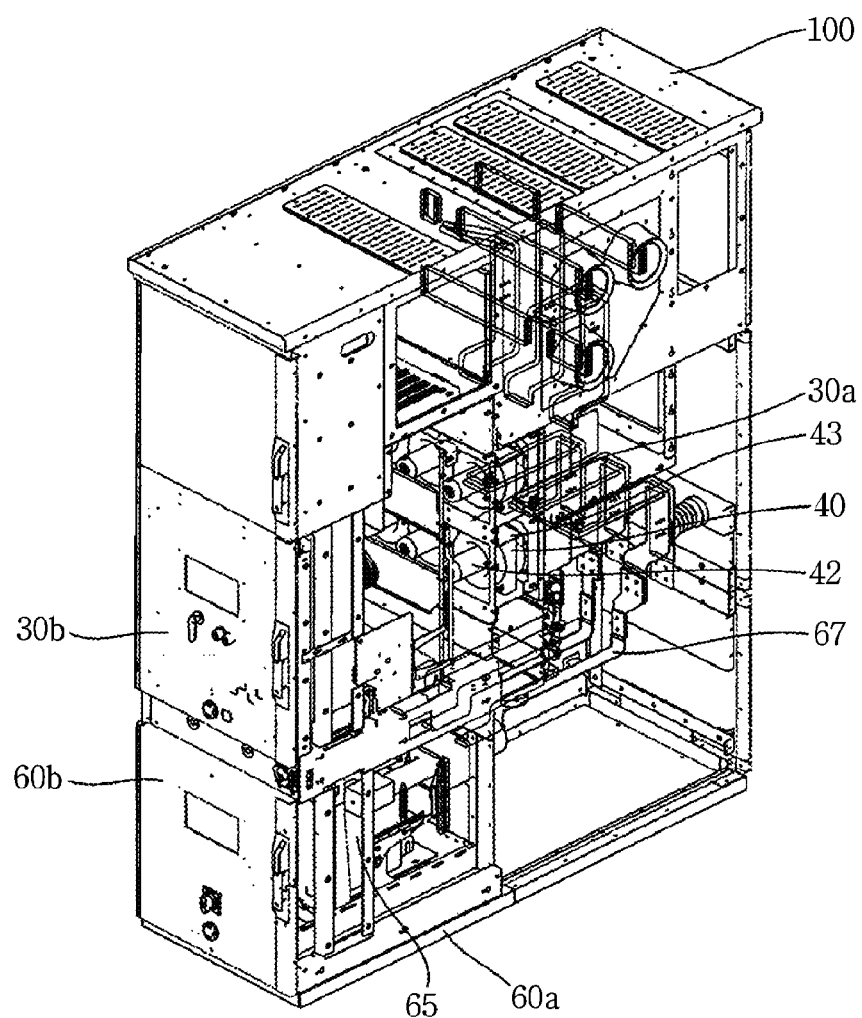
FIG. 16 is a perspective view illustrating the inside of a switchboard according to an embodiment when a circuit breaker and a voltage transformer are input into a switchboard according to an embodiment.
Figure 17:
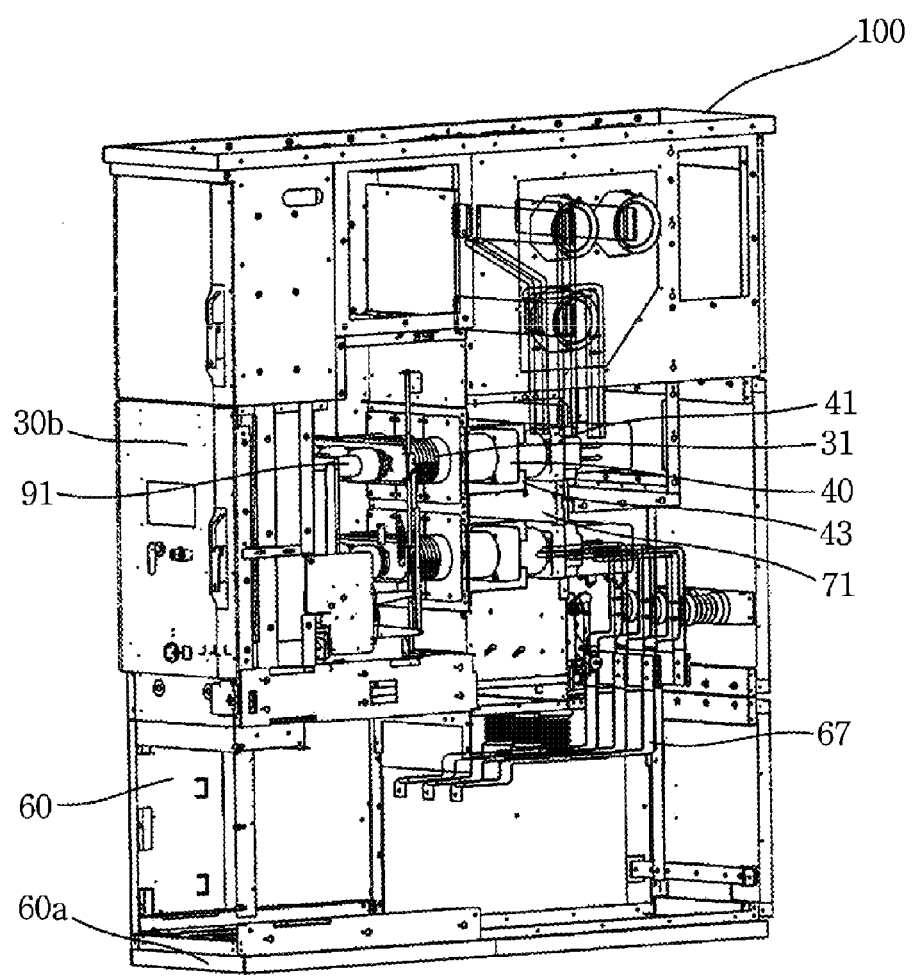
FIG. 17 is a perspective view illustrating a state in which a voltage transformer and a voltage transformer cradle are output from a switchboard according to an embodiment.
Figure 18:
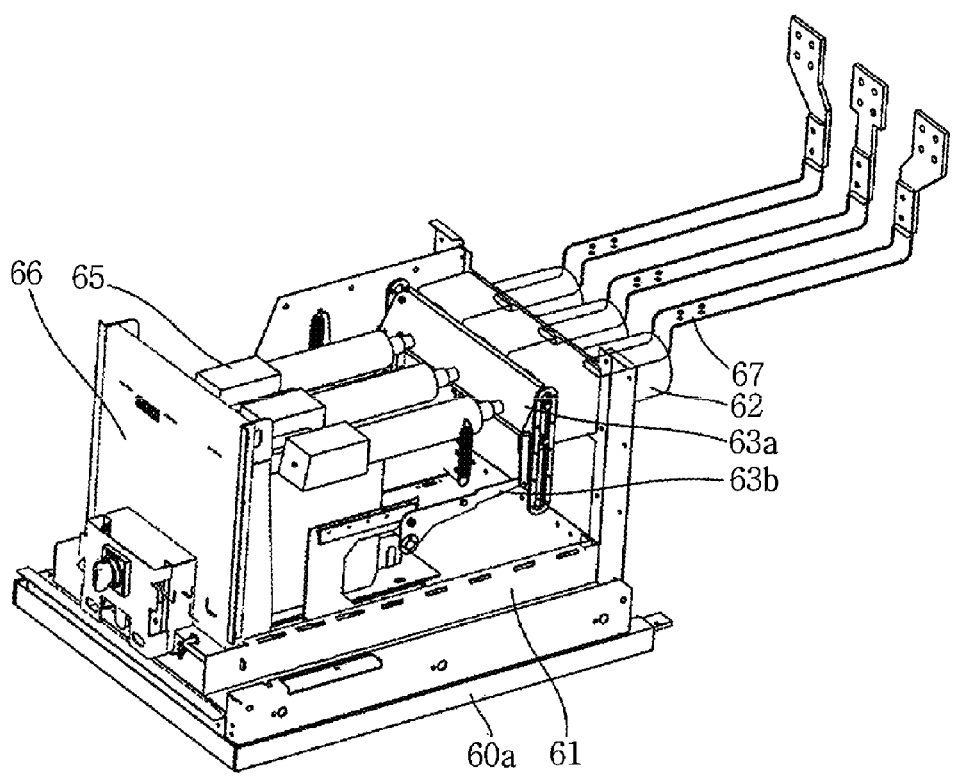
FIG. 18 is a perspective view illustrating a voltage transformer body, a voltage transformer cradle, a voltage transformer bus bar, and a transferring cart of a switchboard according to an embodiment.
Figure 19:
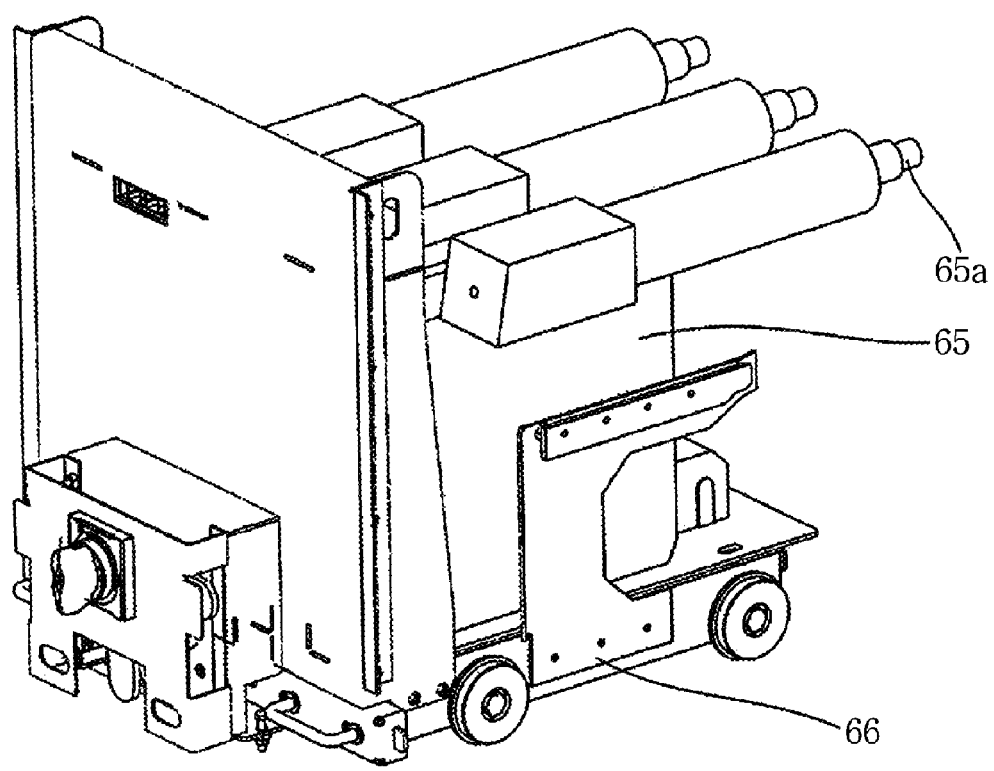
FIG. 19 is a perspective view illustrating a voltage transformer body and a transferring cart of a switchboard according to an embodiment.
Figure 20:
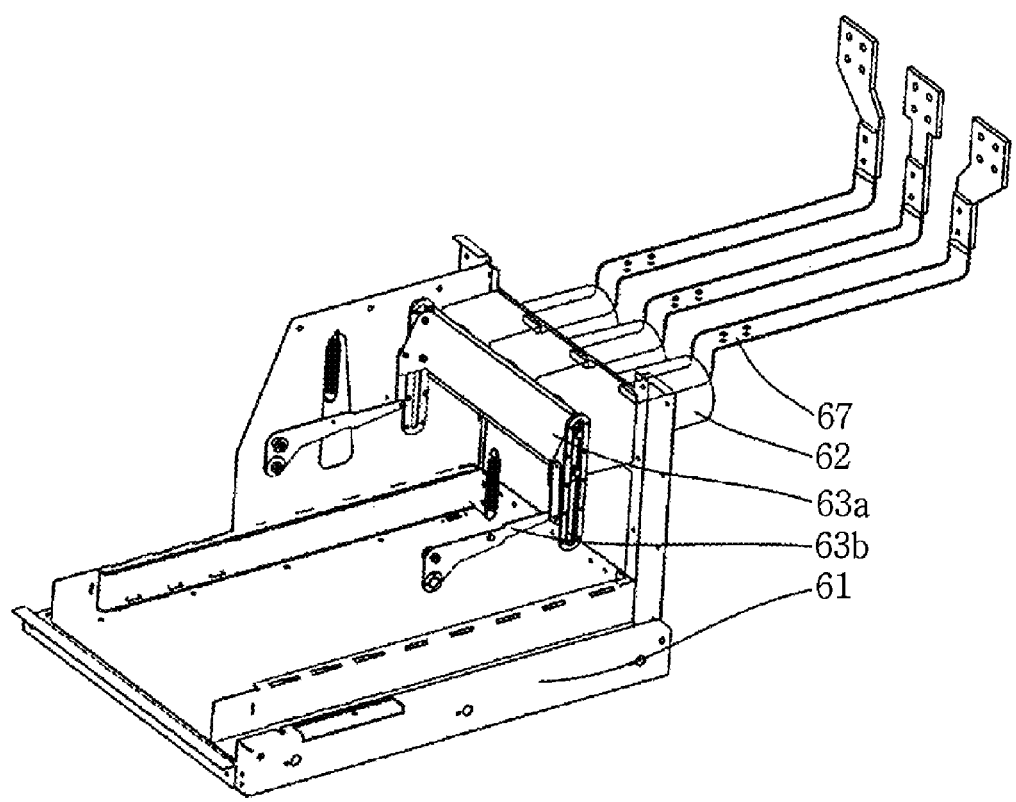
FIG. 20 is a perspective view illustrating a voltage transformer cradle and a voltage transformer bus bar of a switchboard according to an embodiment.
Figure 21:
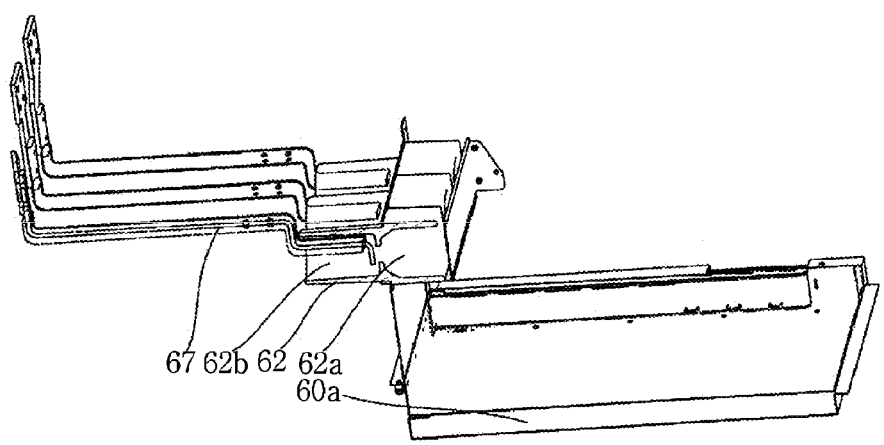
FIG. 21 is a cross-sectional view of the cradle bushing illustrated in FIG. 20.

The switchboard, as illustrated in FIGS. 16 and 17, may include a casing 100 forming the outer appearance thereof. The casing 100 may have a front opening portion, and several components in the switchboard may enter and exit through the front opening portion.

The casing 100 may be made of an assembly of at least two members. If necessary, at least a part of the casing 100 may be configured as a door that is opened and closed. The casing 100 may include a lower body, a rear body, a pair of side bodies, and an upper body. At least one of the lower body, rear body, side bodies, and upper body may be made of an assembly of a plurality of members.

The casing 100 may have a circuit breaker chamber 30 capable of accommodating a circuit breaker 90 therein. The casing 100 may have a low voltage device chamber 50 accommodating a low voltage device therein. The casing 100 may have a voltage transformer chamber 60 accommodating a metering voltage transformer therein. The casing 100 may have a bus bar chamber 70 through which a bus bar passes. The casing 100 may have a cable chamber 80 which an input/output bus or a cable enters.

A front surface portion of the casing 100 may be opened, and the front opening portion may be disposed at a front portion of the casing 100. The front opening portion may be opened in forward and backward directions at the front portion of the casing 100.

The switchboard may include at least one front door opening and closing the front opening portion. At least one front door, as illustrated in FIGS. 16 and 17, may include a circuit breaker chamber door 30b opening and closing the circuit breaker chamber 30 and a voltage transformer chamber door 60b opening and closing the voltage transformer chamber 60. At least one front door may further include a low voltage device chamber door (not indicated by a reference numeral) opening and closing the low voltage device chamber 50.

The insides of the circuit breaker chamber 30, the voltage transformer chamber 60, and the low voltage device chamber 50 may be seen when the front door is opened.

The metering current transformer 40 may have a hollow portion wrapping a part of the metering current transformer bushing 31, and may be disposed outside the metering current transformer bushing 31. A part of the metering current transformer bushing 31 may be inserted into the hollow portion of the metering current transformer 40.

The metering current transformer 40 may be mounted from a front position toward a rear direction when mounted on the switchboard, and may be removed from a rear position toward a front direction when separated from the switchboard. That is, the metering current transformer 40 may be attached and detached in forward and backward directions.

The switchboard may include a terminal bushing mounter 71 on which the terminal bushing 41 is mounted. The terminal bushing mounter 71 may be disposed inside at least one of the bus bar chamber 70 and cable chamber 80. The terminal bushing 41 may be disposed at the terminal bushing mounter 71 and supported on the terminal bushing mounter 71. The terminal bushing mounter 71 may be connected to a rear plate 30a of the circuit breaker chamber 30. A horizontal supporting rod 72 may be provided in a lower portion of the terminal bushing mounter 71.

The rear plate 30a of the circuit breaker chamber 30 may make the circuit breaker chamber 30 partitioned from another space in a rear portion side thereof, and the terminal bushing mounter 71 may make the position of the terminal bushing 41 maintained, while being supported on the rear plate 30a of the circuit breaker chamber 30. The rear plate 30a of the circuit breaker chamber 30 may form a rear portion of the circuit breaker chamber 30, and the rear late 30a of the circuit breaker chamber 30 may partition the circuit breaker chamber 30 disposed at the front thereof and the bus bar chamber 70 disposed at the rear thereof. The rear plate 30 of the circuit breaker chamber 30 may be lengthily disposed in upper and lower directions in the casing 100.

Figure 9:
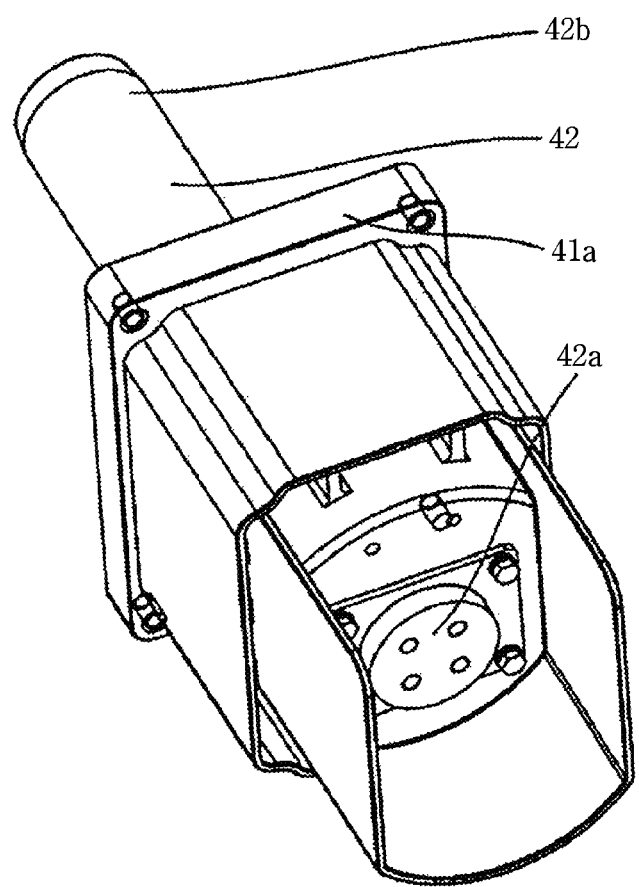
FIG. 9 is a rear perspective view illustrating a terminal bushing of a switchboard according to an embodiment.
Figure 10:
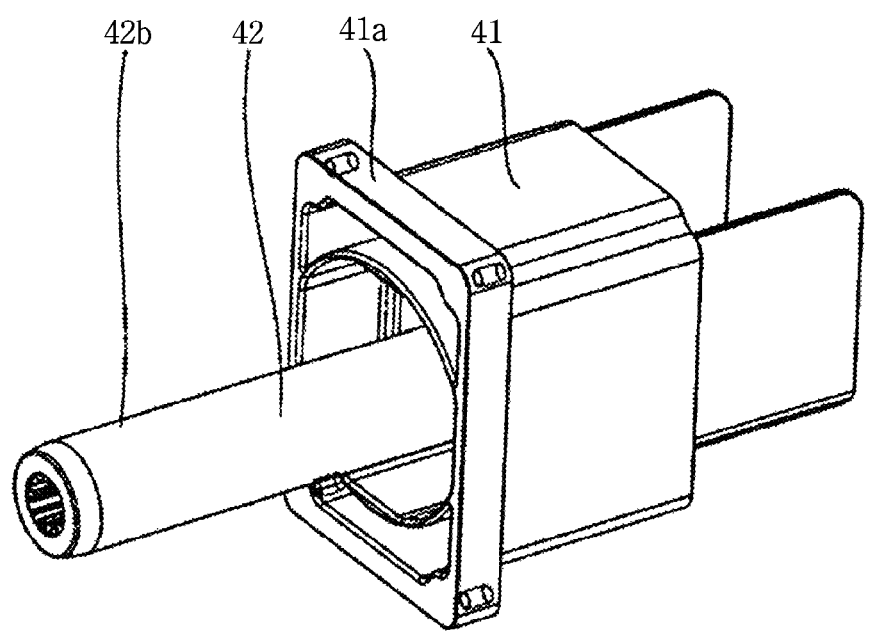
FIG. 10 is a front perspective view illustrating a terminal bushing of a switchboard according to an embodiment.

The terminal bushing 41, as illustrated in FIGS. 9 and 10, may be provided in a box shape having one open side. The terminal bushing 41 may be coupled to the terminal bushing mounter 71 with a flange 41a disposed at one side thereof. The terminal bushing 41 may be inserted into the terminal bushing mounter 71 from a front direction.

The terminal bushing mounter 71 may be disposed in the rear of the rear plate 30a of the circuit breaker chamber 30.

A terminal bushing through-hole in which the terminal bushing 41 is inserted may be defined in the terminal bushing mounter 71. The flange 41a may be caught around the terminal bushing through-hole when the terminal bushing 41 is mounted on the terminal bushing mounter 71, and the insertion of the terminal bushing 41 may be completed when the flange 41a is caught by the terminal bushing mounter 71. The terminal bushing 41 may be supported on the terminal bushing mounter 71 by being mounted on the terminal bushing mounter 71.

The switchboard terminal 42 may be lengthwise provided in forward and backward directions and include: a power supply side bus bar contacting portion connected to a power supply side bus bar 45 to be described below; and a metering current transformer bushing contacting portion supported by contacting the metering current transformer bushing 40. Hereinafter, the power supply side bus bar contacting portion will be described as being termed one end 42a of the switchboard terminal 42, and the metering current transformer bushing contacting portion will be described as being termed the other end 42b of the switchboard terminal 42.

One end 42a of the switchboard terminal 42 may penetrate through the terminal bushing 41, and one end 42a penetrating through the terminal bushing 41 contacts the power supply side bus bar 45, so that the switchboard terminal 42 is connected to the power supply side bus bar 45.

A current transformer mounter 43 is disposed at the rear plate 30a of the circuit breaker chamber 30. The metering current transformer 40 may be disposed at the current transformer mounter 43. The current transformer mounter 43 may be provided to contact the rear surface of the rear plate 30a of the circuit breaker chamber 30. The current transformer mounter 43 may be spaced apart from the terminal bushing 41 in forward and backward directions. The current transformer mounter 43 may be provided in a hollow container body shape, and at least a part of the metering current transformer 40 may be inserted into the current transformer mounter 43. A stopper by which the metering current transformer 40 is caught in a rear direction may be disposed at the rear end of the current transformer mounter 43. When the metering current transformer 40 is mounted, a mounted position of the metering current transformer 40 may be discerned by being caught by the stopper disposed at the rear end of the current transformer mounter 43. That is, the stopper of the current transformer mounter 43 may perform a function of discerning a mounted position of the current transformer mounter 43.

The metering current transformer bushing 31 may be disposed at the rear plate 30a of the circuit breaker chamber 30. The metering current transformer bushing 31 may be inserted from the front of the rear plate 30a of the circuit breaker chamber 30. A metering current transformer bushing through-hole in which the metering current transformer bushing 31 is inserted may be defined in the rear plate 30a of the circuit breaker chamber 30.

Figure 11:
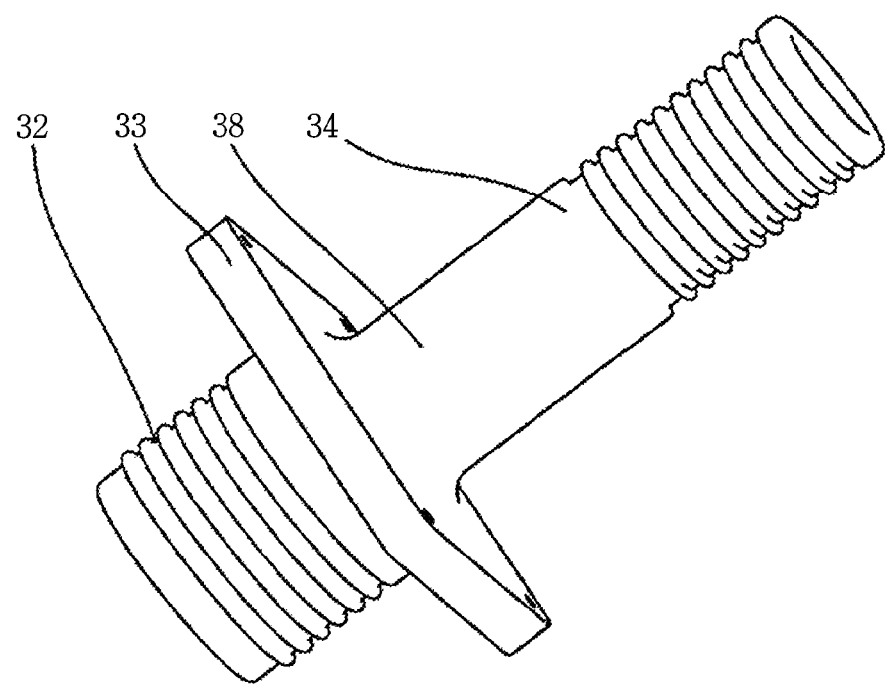
FIG. 11 is a perspective view illustrating a metering current transformer bushing of a switchboard according to an embodiment.
Figure 12:
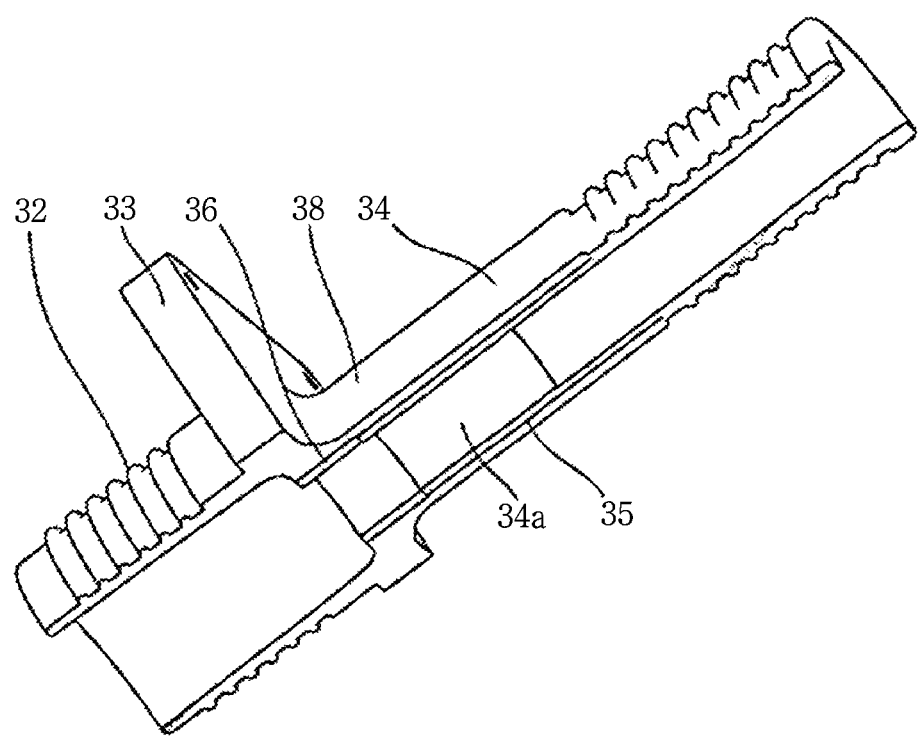
FIG. 12 is a partial cut-away perspective view illustrating the metering current transformer bushing of FIG. 11.
Figure 13:
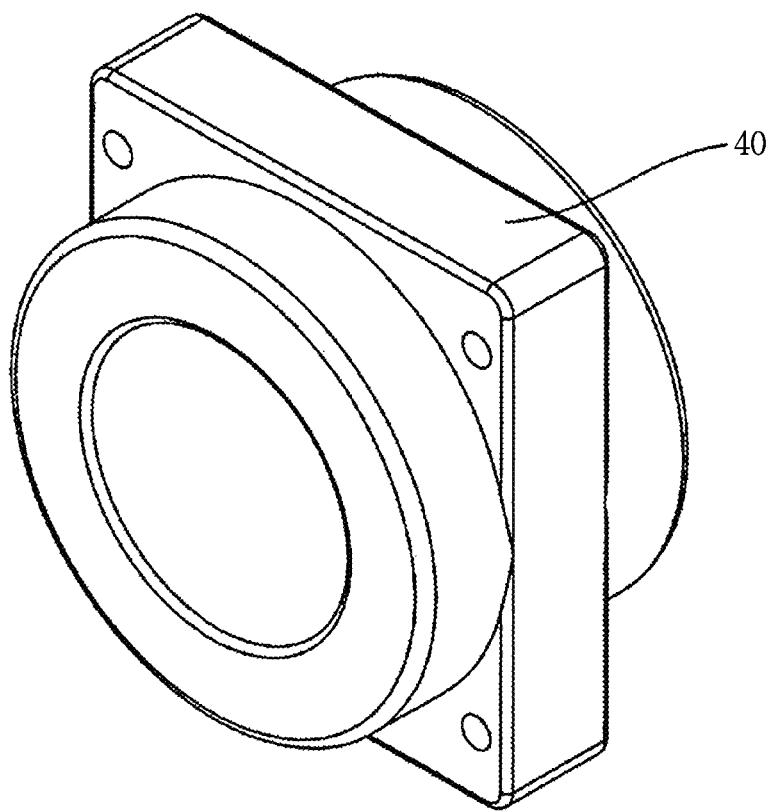
FIG. 13 is a perspective view illustrating a bushing-type current transformer of a switchboard according to an embodiment.
Figure 14:
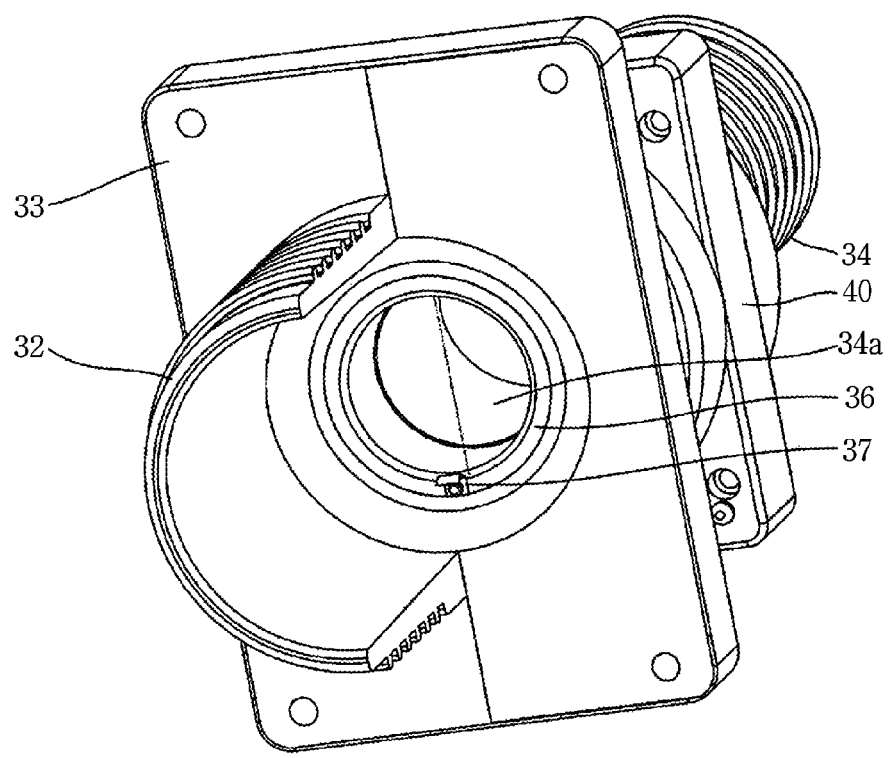
FIG. 14 is a partial cut-away perspective view illustrating a state in which a metering current transformer is coupled to a metering current transformer bushing of a switchboard according to an embodiment.

A protrusion portion 33 (refer to FIGS. 10 and 11) protruding on the metering current transformer bushing 31 may be caught around the metering current transformer bushing through-hole when the metering current transformer bushing 31 is mounted on the rear plate 30a of the circuit breaker chamber 30, and the insertion of the metering current transformer bushing 31 may be completed when the protrusion portion 33 is caught by the rear plate 30a of the circuit breaker chamber 30. The metering current transformer bushing 31 may be supported on the rear plate 30a of the circuit breaker chamber 30 by being mounted on the rear plate 30a of the circuit breaker chamber 30.

Referring to FIGS. 11 to 14, the metering current transformer bushing 31 may be provided in a pipe shape having a flange overall. The metering current transformer bushing 31 may include a head portion, a protrusion portion 33, and a body portion 34.

The head portion 32 is a portion in which the switchboard terminal 42 and a main circuit terminal 91 of the circuit breaker 90 may be inserted and coupled. The head portion 32 may be provided in a hollow container body shape. The head portion 32 may include an inner space in which a part of the switchboard terminal 42 and the main circuit terminal 91 are inserted, and the main circuit terminal 91 may contact the switchboard terminal 42 in the inner space. The head portion 32 may be a protector protecting the main circuit terminal 91 and a part of the switchboard terminal 42 together. Wrinkles may be formed on the outer circumferential surface of the head portion 32. The wrinkles formed on the outer circumferential surface of the head portion 32 have an effect in increasing a creeping distance.

The protrusion portion 33 is a portion capable of being supported on and coupled to the rear plate 30a of the circuit breaker chamber 30. The protrusion portion 33 may be provided in a flange shape. The protrusion portion 33 may be provided to be larger than the head portion 32. A worker may make the protrusion portion 33 coupled to the rear plate 30a of the circuit breaker chamber 30 through bolt assembly and the like, and the metering current transformer bushing 31 may be fixed by the protrusion portion 33. The protrusion portion 33 may be coupled to be disposed in the front of the rear plate 30a of the circuit breaker chamber 30 so that assembly work can be performed in the circuit breaker chamber 30.

The body portion 34 may be provided to be smaller than the head portion 32. The body portion 34 may have a hollow container body shape just like the head portion 32. The body portion 34 may have a smaller diameter than the head portion 32. The body portion 34 may extend from the protrusion portion 32. The body portion 34 may have a shape protruding from the protrusion portion 32.

Wrinkles may be formed on the outer circumferential surface of the body portion 34. The wrinkles may be formed on the overall outer circumferential surface of the body portion 34, and may be formed on a part of the outer circumferential surface thereof as well. The wrinkles formed on the outer circumferential surface of the body portion 34 have an effect in increasing a creeping distance.

A stress control sealed member 35 may be disposed inside the metering current transformer bushing 31. The stress control sealed member 35 may be made of aluminum wire mesh and the like. The stress control sealed member 35 may be provided in a hollow container body shape or a ring shape. The stress control sealed member 35 may be disposed to be integrated with the metering current transformer bushing 31. The stress control sealed member 35 is able to be disposed in the body portion 34. A section in which the stress control sealed member 35 is disposed may be longer than a section in which the metering current transformer 40 is disposed, in the metering current transformer bushing 31. A forward and backward direction length of the stress control sealed member 35 may be longer than a forward and backward direction length of the metering current transformer 40.

The metering current transformer bushing 31 may include an inner supporting portion 34a supporting the switchboard terminal 42. The inner supporting portion 34a may be provided to protrude on the inner circumference of the metering current transformer bushing 31. The inner supporting portion 34a may protrude along the inner circumferential surface of the body portion 34 in the body portion 34. The inner supporting portion 34a supports the other end 42b of the switchboard terminal 42. The other end 42b of the switchboard terminal 42 may be supported by contacting the inner supporting portion 34a.

The switchboard terminal 42 may be provided in a long rod shape. One end 42a of the switchboard terminal 42 may be coupled to the terminal bushing 41, and the other end 42b of the switchboard terminal 42 may be supported on the inner supporting portion 34a. The switchboard terminal 42 may be stably maintained overall. When the switchboard terminal 42 is inserted into the body portion 34, a part other than being supported on the inner supporting portion 34a of the body portion 34 may be spaced apart from the metering current transformer bushing 31. The front end of the switchboard terminal 42 protrudes into the head portion 32 to be connected to the main circuit terminal 91.

A ring conductor portion 36 may be disposed at the metering current transformer bushing 31. The ring conductor portion 36 may be disposed at a front surface portion of the body portion 34. The ring conductor portion 36 may be made of aluminum. The ring conductor portion 36 may be connected to the stress control sealed member 35.

An earthing member 37 may be coupled to the ring conductor portion 36. The earthing member 37 may form an earth circuit by contacting the switchboard terminal 42. The earthing member may be made of a leaf spring.

A semi-conductive layer 38 may be disposed at the outer circumferential surface of the body portion 34. The semi-conductive layer 38 may be provided to be painted with a semi-conductive material.

The semi-conductive layer 38 may be satisfied with equipotentiality by being connected to a frame of the switchboard such as the rear plate 30a of the circuit breaker chamber 30 by a leading wire (not shown) and the like. A frame of the switchboard may be provided as a part of the casing 100 and disposed in the casing 100 separately from the casing 100 to serve as a supporter supporting several sorts of devices disposed at the switchboard.

The inside of the metering current transformer 40 comes in contact with the switchboard terminal 42 by the stress control sealed member 35, the outside of the metering current transformer 40 may be earthed by the semi-conductive layer 38, and a dielectric breakdown phenomenon caused by the Corona phenomenon after long-term usage may be minimized.

The metering current transformer 40 may be disposed at the metering current transformer bushing 31. The metering current transformer 40 may be disposed at the body portion 34 of the metering current transformer bushing 31. The metering current transformer 40 may be provided in a ring shape to be disposed at the outer circumferential surface of the metering current transformer bushing 31. The metering current transformer 40 may be a bushing-type current transformer.

Figure 15:
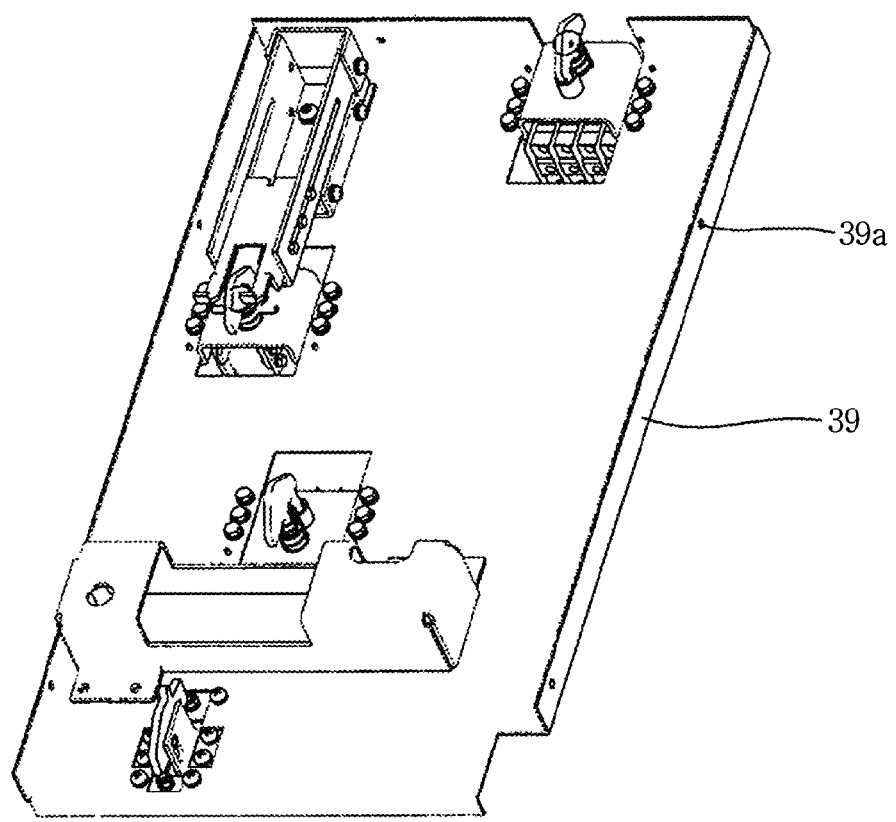
FIG. 15 is a perspective view illustrating a base plate of a circuit breaker chamber of a switchboard according to an embodiment.

FIG. 15 illustrates a base plate 39 of the circuit breaker chamber 30. The base plate 39 may form a lower portion of the circuit breaker chamber 30 and an upper plate of a middle base of the switchboard. The base plate 39 may be horizontally disposed in the casing 100. The base plate 39 may be made of a separate module capable of being separated from the circuit breaker chamber 30 and switchboard.

The base plate 39 may be screwed to a middle base side plate 55b through a tapped hole 39a defined in a side surface thereof. When the base plate 39 is removed from the switchboard, the circuit breaker chamber 30 and voltage transformer chamber 60 may be connected, and a sufficient space needed for the maintenance of the switchboard may be ensured. Several sorts of devices disposed at a lower portion of a cradle may be provided at the base plate 39.

A middle base front surface plate 55a may be removed as well. The base plate 39 and middle base front surface plate 55a may be simultaneously removed, and the circuit breaker chamber 30 and voltage transformer chamber 60 are completely opened, so that a space capable of helping maintenance in an internal front direction of the casing 100 may be provided.

Referring to FIGS. 16 to 21, a voltage transformer cradle 61 may be disposed at the voltage transformer chamber 60. The voltage transformer cradle 61 may be fixed and disposed to a lower plate 60a of the voltage transformer chamber 60 by bolts and the like. That is, when bolts fixing the voltage transformer cradle 61 are released, the voltage transformer cradle 61 may be separated from the switchboard. FIG. 17 illustrates the inside of a switchboard having the voltage transformer cradle 61 removed therefrom. Here, the lower plate 60a of the voltage transformer chamber 60 may be disposed at a lower portion of the voltage transformer chamber 60, and a top surface thereof may face the voltage transformer chamber 60.

A voltage transformer body 65 (a power transformer) is carried through a transferring cart 66 to be input into or output from the voltage transformer cradle 61.

A voltage transformer cradle shutter 63a and a voltage transformer cradle shutter assembly 63b may be provided at the voltage transformer cradle 61.

A voltage transformer cradle bushing is provided at the voltage transformer cradle 61.

A voltage transformer bus bar 67 may be input into a rear portion 62b of a voltage transformer cradle bushing 62. When the voltage transformer body 65 is input to an operation position, a voltage transformer terminal 65a is directly connected to the voltage transformer bus bar 67 through a contacting technique by being input into a front portion 62a of the voltage transformer cradle bushing 62. Here, an elastic member capable of having a contacting and pressing force may be provided at an end portion of the voltage transformer terminal 65a.

That is, the voltage transformer terminal 65a is directly connected to the voltage transformer bus bar 67 through a contacting technique without coupling with a cradle terminal or a connection bus bar. Accordingly, the voltage transformer cradle 61 is led out without separate removing work, so that the voltage transformer terminal 65a may be easily separated from the voltage transformer bus bar 67. The voltage transformer terminal 65a is not in contact with the voltage transformer cradle bushing 62, so that an insulating function may be improved.

An example of a step of performing maintenance on a switchboard according to an embodiment will be described.

First, a worker may open a circuit breaker chamber door 30b and led out a circuit breaker 90. The circuit breaker 90 may be led out along with a circuit breaker transferring cart. The worker may remove a middle base front surface plate 55a and a circuit breaker chamber base plate 39. In addition, the worker may separate and remove a voltage transformer cradle 61.

The worker may separate a metering current transformer bushing 31 from a rear plate 30a of a circuit breaker chamber 30 and remove the metering current transformer bushing 31 in a forward direction. Moreover, the worker may separate a metering current transformer 40 from a current transformer mounter 43 and remove the metering current transformer 40 in a forward direction. That is, both the metering current transformer bushing 31 and the metering current transformer 40 may be separated in a forward direction from installed positions thereof.

When the middle base front surface plate 55a and circuit breaker chamber base plate 39 are removed, the circuit breaker chamber 30 is connected with a voltage transformer chamber 60, and a space through which the worker may enter and exit may be sufficiently ensured in a casing 100. The worker is able to easily enter the inside of the casing 100 in the front of the casing 100 and easily perform maintenance on each of components in the switchboard.

When a switchboard applied with a bushing-type current transformer according to an embodiment is provided at a place in which a rear surface space of the switchboard is insufficient or a space between the rear surface of the switchboard and a rear wall is insufficient, a worker may perform maintenance by entering the switchboard through the front surface thereof.

To this end, a terminal bushing is provided at a bus bar chamber and a cable chamber, and a metering current transformer capable of being separated in a front direction may be provided. In addition, a metering current transformer bushing capable of being separated in a front direction may be provided at a rear plate of a circuit breaker chamber. Moreover, a circuit breaker chamber base plate is made of a module capable of being separated and removed, so that the circuit breaker chamber is connected to a voltage transformer chamber to be opened together when the module is removed.

Furthermore, a stress control sealed member is inserted into the metering current transformer bushing to be connected to a switchboard terminal. A semi-conductive layer is provided outside the metering current transformer bushing, and a part of the semi-conductive layer is connected to a switchboard frame and earthed, so that a dielectric breakdown phenomenon, the Corona phenomenon, and the like are prevented.

Still more, a voltage transformer terminal is directly connected to a bus bar through a contacting technique, so that a voltage transformer cradle is easily separated. Here, the voltage transformer terminal is not in contact with a voltage transformer cradle bushing, so that an insulating function is improved.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the appended claims.

What is claimed is:

1. A switchboard applied with a bushing-type current transformer, the switchboard comprising:
 a terminal bushing inserted from a front direction;
 a switchboard terminal coupled to the terminal bushing;
 a metering current transformer bushing inserted from the front direction and inserted into the terminal bushing while surrounding the switchboard terminal; and
 a metering current transformer disposed outside the metering current transformer bushing and assembled or disassembled at a front surface through a circuit breaker chamber,
 wherein a terminal bushing mounter at which the terminal bushing is installed is provided inside at least one of a bus bar chamber and a cable chamber.

2. The switchboard according to claim 1, wherein a current transformer mounter at which the metering current transformer is installed is provided on a rear plate of the circuit breaker chamber.

3. The switchboard according to claim 1, wherein the metering current transformer bushing comprises:
 a head portion;
 a protrusion portion protruding from the head portion and provided in a flange shape; and
 a body portion extending from the protrusion portion.

4. The switchboard according to claim 3, wherein ridges are formed on the outer circumferential surface of at least one of the head portion and body portion.

5. The switchboard according to claim 3, further comprising a stress control sealed member disposed at the body portion.

6. The switchboard according to claim 5, wherein a section in which the stress control sealed member is installed is longer than a section in which the metering current transformer is installed.

7. The switchboard according to claim 3, wherein an inner supporting portion supporting an end of the switchboard terminal is provided in the body portion.

8. The switchboard according to claim 7, wherein the switchboard terminal is spaced without contacting the metering current transformer bushing excluding the inner supporting portion.

9. The switchboard according to claim 3, wherein a ring conductor portion is disposed at a front surface portion of the body portion.

10. The switchboard according to claim 9, wherein an earthing member is coupled to the ring conductor portion, and
 the earthing member contacts the switchboard terminal.

11. The switchboard according to claim 3, wherein a semi-conductive layer is disposed on the outer circumferential surface of the body portion.

12. The switchboard according to claim 1, wherein a base plate forming a lower portion of the circuit breaker chamber is made of a module that is separated from the switchboard.

13. The switchboard according to claim 1, further comprising a voltage transformer body input into or output from a voltage transformer chamber and a voltage transformer bus bar installed in a bus bar chamber or a cable chamber, wherein a voltage transformer terminal of the voltage transformer body is directly connected to the voltage transformer bus bar.

14. The switchboard according to claim 13, wherein:
 a voltage transformer cradle is provided at the voltage transformer chamber,
 a voltage transformer cradle bushing is disposed at the voltage transformer cradle,
 the voltage transformer bus bar is input into a rear portion of the voltage transformer cradle bushing, and
 the voltage terminal, when the voltage transformer body is input to an operation position, is directly connected to the voltage transformer bus bar by being input into a front portion of the voltage transformer cradle bushing while not contacting the voltage transformer cradle bushing.

15. A switchboard applied with a bushing-type current transformer, the switchboard comprising:
 a casing having a front opening portion and a circuit breaker chamber including a circuit breaker disposed therein;
 a terminal bushing mounter disposed in the casing;
 a terminal bushing inserted into the terminal bushing mounter from a front portion of the terminal bushing mounter;
 a switchboard terminal coupled to the terminal bushing;
 a metering current transformer bushing inserted into a circuit breaker chamber rear plate forming the circuit breaker chamber, surrounding the switchboard terminal, and having a part inserted into the terminal bushing;
 a current transformer mounter disposed at the circuit breaker chamber rear plate; and
 a metering current transformer inserted into the current transformer mounter in a front portion of the current transformer mounter and assembled or disassembled by passing through the circuit breaker chamber.

16. The switchboard according to claim 15, further comprising:
 a stress control sealed member disposed in the metering current transformer bushing;
 a ring conductor portion disposed at the metering current transformer bushing to be connected to the stress control sealed member;
 an earthing member coupled to the ring conductor portion and contacting the switchboard terminal 42 to form an earth circuit; and
 a semi-conductive layer disposed at the outer surface of the metering current transformer bushing and earth-connected.

17. The switchboard according to claim 15, wherein a base plate forming a lower portion of the circuit breaker chamber is made of a module that is separated from the switchboard.

18. The switchboard according to claim 17, wherein the casing is partitioned into:
 a voltage transformer chamber having a voltage transformer disposed therein,
 a bus bar chamber through which a bus bar passes, and
 a cable chamber which a input/output bus or a cable enters,
 the switchboard further comprising:
 a voltage transformer body input into or output from the voltage transformer chamber, and
 a voltage transformer bus bar disposed in at least one of the bus bar chamber and cable chamber, a voltage transformer terminal of the voltage transformer body being directly connected to the voltage transformer bus bar.

19. The switchboard according to claim 18, wherein:

a voltage transformer cradle is provided at the voltage transformer chamber, a voltage transformer cradle bushing is disposed at the voltage transformer cradle, the voltage transformer bus bar is input into a rear portion of the voltage transformer cradle bushing, and the voltage terminal, when the voltage transformer body is input to an operation position, is directly connected to the voltage transformer bus bar by being input into a front portion of the voltage transformer cradle bushing while not contacting the voltage transformer cradle bushing.

* * * * *